United States Patent [19]

Guest

[11] Patent Number: 5,083,108
[45] Date of Patent: Jan. 21, 1992

[54] WARNING DEVICE FOR A BICYCLE

[76] Inventor: John R. Guest, 131 Spadina Avenue, Ottawa, Ontario, Canada, K1Y 2C2

[21] Appl. No.: 656,737

[22] Filed: Feb. 19, 1991

[51] Int. Cl.⁵ .............................................. B62J 3/00
[52] U.S. Cl. .................................... 340/432; 340/391
[58] Field of Search ............... 340/432, 384 E, 384 R, 340/388, 391; 116/142 R, 28 R; 362/72

[56] References Cited

U.S. PATENT DOCUMENTS

| | | | |
|---|---|---|---|
| 2,416,160 | 2/1947 | Davidsson | 340/432 |
| 2,469,944 | 5/1949 | Bauters | 340/432 |
| 2,603,701 | 7/1952 | Schadel, Jr. | 340/432 |
| 4,623,954 | 11/1986 | Schott et al. | 362/72 |
| 4,716,502 | 12/1987 | Scott et al. | 362/72 |
| 4,779,169 | 10/1988 | Cruze | 362/72 |
| 4,875,142 | 10/1989 | Spector | 362/72 |
| 4,915,054 | 4/1990 | Vidovic et al. | 116/142 FP |

*Primary Examiner*—Jin F. Ng
*Assistant Examiner*—Brian R. Tumm
*Attorney, Agent, or Firm*—Thomas Adams

[57] ABSTRACT

A warning device for incorporation in the handle-bar of a bicycle has a casing with a tubular portion and a head portion. The tubular portion fits inside the end of the handle-bar while the head portion abuts the end of the handle-bar. A flat spring member with an arc-like configuration extends longitudinally outside the tubular portion to engage the inside of the handle-bar and retain the casing in its installed position. There is a battery cell within the tubular portion as well as circuitry. A piezo-electric transducer mounted inside the head portion is connected to the circuitry to form an oscillatory circuit. A switch is mounted externally of the head portion, preferably extending back over the end of the handle-bar. One side of the switch is connected through the spring member to one side of the cell and the other side of the switch is connected to the oscillatory circuit. Closing of the switch supplies power to the oscillatory circuit causing the transducer to generate a warning sound.

15 Claims, 2 Drawing Sheets

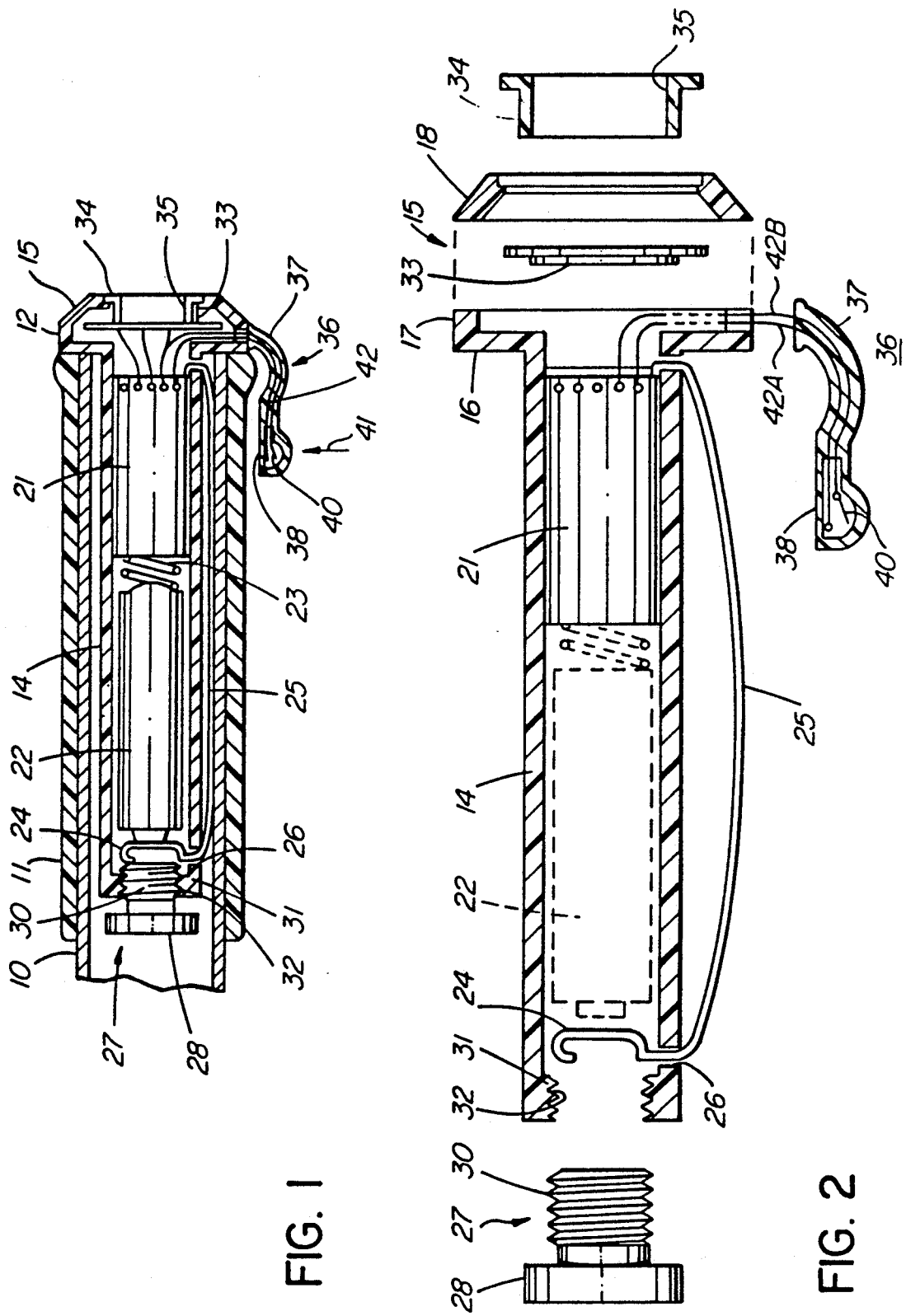

WARNING DEVICE FOR A BICYCLE

BACKGROUND OF THE INVENTION

This invention relates to a warning device for a bicycle, and in particular to a warning device or sound generating device adapted for disposition in the end portion of the handle-bar of a bicycle.

The use of bicycles for exercise and recreation as well as for transportation has been increasing and it appears the number of bicycles in use may continue to increase. The large number of bicycles increases the situations in which there may be the threat of an accidental injury due to collisions between bicyclists and other vehicles or pedestrians.

Many bicycles are provided with bells for use as warning devices so that the bicyclist may alert other vehicles and pedestrians to the presence of the bicyclist. The bell has limitations. The volume of the sound generated by a bell may be too low to alert other vehicles or pedestrians, particularly in a noisy heavy traffic area, and the pitch may be too high.

U.S. Pat. No. 4,915,054, Vidovic et al, issued Apr. 10, 1990 describes a warning device for a bicycle. A special large handgrip fits over the handle-bar of a bicycle and has a portion extending to one side which incorporates a pressurized gas cylinder. An actuator opens a valve which directs pressurized gas towards a diaphragm. The diaphragm is caused to vibrate, generating a sound which issues from a horn-shaped part extending to one side of the grip. This warning device provides a much greater volume of sound than a bell. However, it requires that the regular handgrip be replaced by a much larger special handgrip which incorporates the pressurized gas cylinder externally of the handle-bar itself, and which extends to one side of the handle-bar.

It is, of course, known to incorporate a light assembly within the end of a bicycle handle-bar. For example, U.S. Pats. Nos. 4,623,954, Schott et al, issued Nov. 18, 1986, and 4,779,169, Cruze, issued Oct. 18, 1988, each show a light assembly which is mounted in the end of a handle-bar and has a light cover or lens projecting beyond the end of the handle-bar to provide a visible light. These assemblies for a safety light are not suitable for use as an audible warning device. Sound generating equipment requires more space than a light bulb and is more complex.

OBJECTS OF THE INVENTION

It is an object of the invention to provide a warning device for a bicycle which generates an audible warning signal and which is readily mounted within the handle-bar of a bicycle.

It is another object of the invention to provide a warning device for a bicycle that is of simple construction with a readily accesible operating switch.

SUMMARY OF THE INVENTION

The present invention is for a warning device for generating an audible sound and adapted for incorporation in the handle-bar of a bicycle. The warning device is of simple construction with a tubular portion for fitting within the end opening of a handle-bar and a head portion which abuts the end of the handle-bar and preferably also abuts the end of a handgrip positioned adjacent the end of the handle-bar. The tubular portion contains drive circuitry connected with a transducer in the head portion. A switch member extends from the head portion, preferably extending over part of the handgrip, and comprises a switch for operating the drive circuit and hence the transducer.

The warning device may be retained in the handle-bar by means of a spring member which has an arc-like configuration and extends longitudinally externally of the tubular portion from a position adjacent the head portion, that is the proximal end of the tubular portion, to the opposite end or distal end of the tubular portion. When the tubular portion is inserted into the open end of a handle-bar, the spring member engages the inner surface of the handle-bar and is deformed. The engagement of the spring member with the inner surface of the handle-bar retains the warning device in position with the tubular portion substantially entirely within the handle-bar. The warning device may be withdrawn by applying sufficient force to overcome the frictional forces due to the engagement between the spring member and the handle-bar.

In preferred embodiments of the invention, the switch member comprises a pressure-actuated membrane or diaphragm switch housed in a flexible sleeve and disposed adjacent the handgrip. The switch can be actuated by squeezing the switch member against the handgrip. Preferably the switch member is pliable and can be conformed to the contour of the underlying handgrip.

The drive circuitry may comprise a power source, for example an electric cell, housed within the tubular portion. The circuitry and the transducer may form an oscillator and may include an amplifier to cause the transducer to vibrate, generating an audible sound.

The warning device is simple and easy to install or mount. The operating switch is readily available for actuation.

According to one embodiment of the invention there is provided a warning device for incorporation in the handle-bar of a bicycle, the handle-bar comprising a handle-bar wall of generally circular cross-section defining a hollow central portion, said warning device comprising a tubular portion for fitting within the hollow central portion of the handle-bar, a head portion having a first wall fixed to a first end of the tubular portion and a second wall spaced outwardly from the first wall defining with a peripheral wall a compartment, the second wall having a sound passing opening, a piezoelectric transducer mounted within the compartment, circuit means within the tubular portion connected with the transducer to form an oscillatory circuit, means for supplying electric power to the oscillatory circuit for generating an audible sound, and switch means extending from the head portion and connected between the means for supplying electric power and the circuit means whereby operating the switch means to a closed condition applies electric power to the circuit means and transducer causing an audible sound to be generated.

BRIEF DESCRIPTION OF THE DRAWINGS

An embodiment of the invention will now be described, by way of example only, with reference to the accompanying drawings, in which:

FIG. 1 is a sectional side view of a warning device according to the invention;

FIG. 2 is an exploded sectional view, slightly enlarged, of the device of the invention;

DESCRIPTION OF THE PREFERRED EMBODIMENTS

Figure 4:
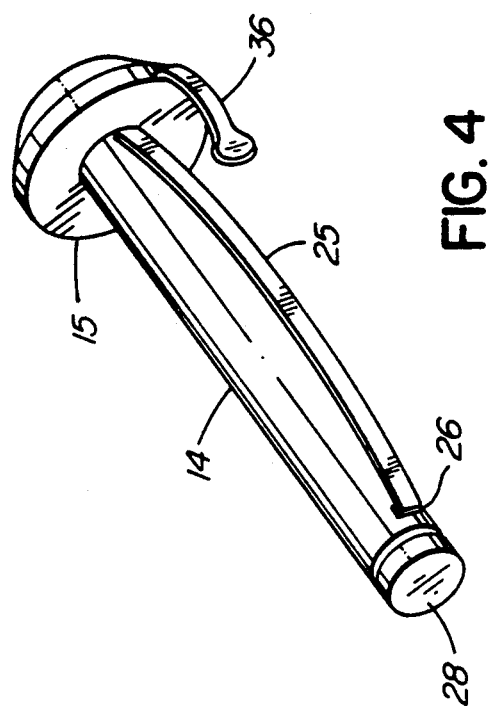
FIG. 4 is a perspective view of a warning device according to the invention.

Referring to FIG. 1, there is shown the end of a handle-bar 10 having thereon a handgrip 11. The ends 12 of the handle-bar 10 and the handgrip 11 are conveniently coextensive. As shown also in FIG. 4, a tubular portion 14 and a head portion 15 comprise the casing of the audible warning device. The tubular portion 14 and the head portion 15 are preferably of an insulating material, such as a plastics material, for example polypropylene.

Figure 2A:
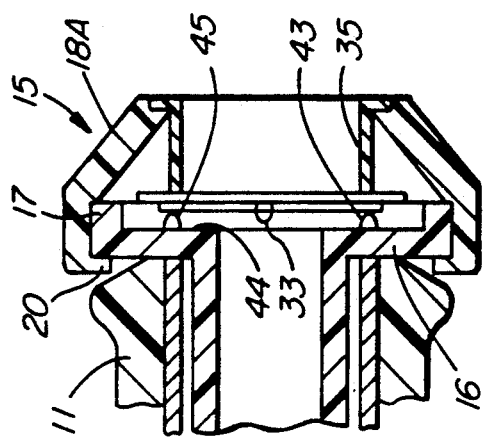
FIG. 2A is a partial sectional side view showing the head portion of an alternate form of the invention.

Referring for the moment to FIGS. 2 and 2A, the head portion 15 is shown in FIG. 2 as having a radially extending base 16 with a circular out-turned flange 17 and a cap 18. The cap 18 is secured to flange 17 using an adhesive, such as an epoxy resin type adhesive.

An alternative arrangement is shown in FIG. 2A which shows a base 16 with a flange 17 as in FIG. 2, but differs in that it shows a cap 18A which extends outwardly of flange 17 and has, at spaced points on its periphery, inwardly directed clips or fastening members 20 which project behind base 16 when cap 18A is installed to hold cap 18A against flange 17. It will be seen in FIG. 2A that the end of handgrip 11 must be recessed slightly to accommodate clips 20. Alternately the base 16 must be spaced outwardly a short distance.

Referring once again to FIG. 1 and to FIG. 2, the tubular portion 14 has a circuit board 21 mounted at the proximal end, that is at the end adjacent the head portion 15. Suitable circuitry is on the circuit board 21 but is not shown in this drawing. It will be described subsequently with reference to FIG. 3. A power source, such as an electric cell 22 or a battery if the tubular portion is lengthened, is contained within tubular portion 14. A spring contact 23 interconnects an end of cell 22 and the circuitry of circuit board 21. The other end of cell 22 contacts an end 24 of a logitudinally extending, flat leaf spring member 25 of electrically conducting material. The spring member 25 passes through an opening 26 in tubular portion 14 at the distal end, and extends longitudinally of the casing to the proximal end of tubular portion 14, that is substantially to the junction of tubular portion 14 and head portion 15, where it passes through the casing and projects within the compartment formed by the casing walls. An end cap or closure 27 has a head 28 and a screw portion 30. There may be a small internal flange 31 at the distal end of tubular portion 14 which has an internal thread 32 for threaded engagement with screw portion 30. When the screw portion 30 of closure 27 is engaged with thread 32 and closure 27 rotated, the end of closure 27 engages the end 24 of spring member 25 and presses the end 24 inwardly against the terminal of cell 22. This ensures good contact and also biases spring member 25 outwardly into an arc-like configuration. When tubular portion 14 is inserted into the handle-bar 10, the arc-like configuration deforms slightly as the spring member 25 is pressed against the inner surface of the handle-bar 10. This ensures good frictional engagement and retains the tubular portion 14 firmly inside handle-bar 10. The tubular portion 14 may be withdrawn by application of sufficient force to head portion 15.

Within head portion 15 is a piezoelectric transducer 33, such as is available commercially under the type name PKM293A0 by Murata Manufacturing Co. Ltd., Japan. The transducer 33 is mounted, for example by bonding with an adhesive, to a tubular insert 34 in head portion 15. Sound vibrations generated by transducer 33 are emitted through opening 35 defined by the walls of tubular insert 34. The opening 35 may, if desired, be sealed by a flexible plastic membrane to exclude moisture.

The piezoelectric transducer has three connections made to it. These connections are a power connection, a feedback connection, and a common connection or "ground". While the connections may be made directly by soldering, it is preferred to form three pads or projections on the inner surface of base 16, which are connected by wires to the circuitry, and which engage appropriate points on the transducer 33 when the head portion 15 is assembled. The pads will be referred to in connection with FIG. 3.

Mounted to the side of head portion 15 is a switch arm 36. Switch arm 36 has an elongate member 37, one end of which extends into, and seals, a slot in the flange 17. The other end of member 37 terminates in a flat sleeve portion 38 containing a pressure-operated membrane switch 40. Two lengths of stiff, yet pliable, copper wire 42A and 42B, respectively, extend through the member 37 to connect the switch 40 to the circuit board 21, as will be described later with respect to FIG. 3.

The member 37 is preferably of flexible insulating material, such as a plastics material, and the flat sleeve member 38 is of a compressible or highly flexible insulating material defining a space in which switch 40 is mounted. The pliability of the copper wires 42A and 42B allows the switch arm to be conformed to the surface of the handgrip by firm pressure on sleeve 37 once the device has been installed in the handle-bar.

To operate the warning device, pressure is applied to switch arm 36, particularly pressure in the area indicated by arrow 41, to press switch arm 36 against handgrip 11 and flex the material of flat member 38 to compress and close membrane switch 40.

Reference was previously made to FIG. 2A where there is shown a form of the invention with head portion 15 comprising a cap 18A fastened to base 16 with clips or fastening members 20. FIG. 2A is shown having pads or contact members 43, 44 and 45. This is the preferred manner of making connection between the circuitry of board 21 and transducer 33 when it is installed.

Figure 3:
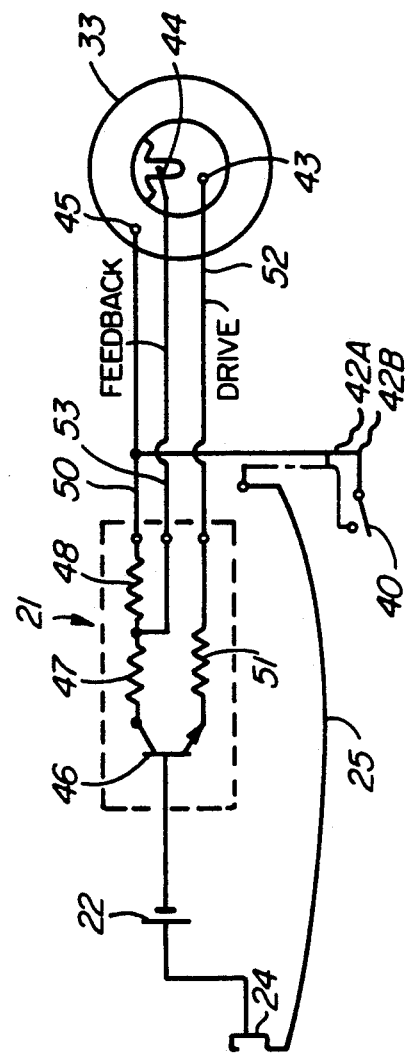
FIG. 3 is a schematic diagram showing a form of circuit suitable for use in the invention.

Referring now to FIG. 3, there is shown one simple form of circuitry suitable for use in the device of the invention. Suitable known alternate forms of circuitry may be used. Cell 22 is shown connected to the base of transistor 46 which is on circuit board 21. The collector of transistor 46 is connected through a series arrangement of resistors 47 and 48 to a conductor 50. Conductor 50 is connected to pad 45 and represents a common or ground connection. The emitter of transistor 46 is connected via resistor 51 and conductor 52 to pad 43. This represents the drive connection or power connection. Conductor 53 is connected at one end to pad 44 and at the other end to the junction between resistors 47 and 48. This represents the feedback connection from transducer 33. The other terminal of cell 22 is connected through end 24 and spring member 25 to conductor or wire 42A. The other side of switch 40 is connected by wire 42B to the conductor 50. The transducer 33 and the associated circuitry oscillate when switch 40 is closed, causing transducer 33 to vibrate and generate sound.

It will be apparent that stages of amplification could be included in the circuitry of FIG. 3. Moreover, the drive circuit might include an inverter stage to allow the device to be used with a power source having an operating voltage significantly lower than that of the piezoelectric transducer.

The warning device of the invention provides a loud sound when actuated to alert the drivers of other vehicles, and pedestrians, of the presence of a bicyclist that has the device installed. The warning device is easily installed, and is of simple design and configuration.

I claim:

1. A warning device for a bicycle, comprising:
    a casing having a tubular portion sized for fitting within the end of a bicycle handle-bar and a head portion for abutting the end of said handle-bar;
    means for securing said warning device to said handle-bar;
    drive circuit means in said tubular portion;
    means for supplying power to said drive circuit means;
    a transducer in said head portion connected with said drive circuit means; and
    switch means operable between and open condition and a closed condition for energizing said drive circuit means to operate said transducer, said switch means comprising a switch arm extending from said head portion to overlie a handgrip portion of said handle-bar when said warning device is installed.

2. A warning device as claimed in claim 1, wherein said securing means comprises a leaf spring member extending longitudinally outside said tubular portion and secured by its opposite ends thereto, said leaf spring member being biased into an arc-like configuration for engagement with the inner surface of said handle-bar to retain said tubular portion therein.

3. A warning device as claimed in claim 2, wherein one end portion of said tubular portion is screwthreaded and carries a correspondingly screwthreaded end cap, and one end of said leaf spring member engages the end cap such that, as the end cap is tightened, a medial portion of said leaf spring member is biased away from said tubular portion.

4. A warning device as claimed in claim 3, wherein said leaf spring member is an electrical conductor connected in series with said drive circuit means, said drive circuit means comprises an electric cell, and said end cap urges said one end of said leaf spring member into contact with one terminal of said cell.

5. A warning device as claimed in claim 1, wherein said switch arm comprises a pressure-actuable switch membrane housed in a flexible sleeve.

6. A warning device as claimed in claim 5, wherein said switch arm is pliable and conformable to said handgrip portion.

7. A warning device as claimed in claim 1, wherein said transducer comprises a piezoelectric device, said drive circuit means and said piezoelectric device comprising an oscillatory circuit.

8. A warning device as claimed in claim 1, in which said means for supplying electric power comprises at least one electric cell within said tubular portion.

9. A warning device as claimed in claim 1, in which said casing is of an insulating material.

10. A warning device for generating an audible warning sound and adapted for incorporation in the end of a handle-bar of a bicycle, said handle-bar comprising a wall of generally circular cross-section defining a hollow central portion and having a handgrip around the outer surface of said wall of said handle-bar, said handgrip having an end which is generally co-extensive with the end of said wall, said warning device comprising a casing of insulating material having a tubular portion for fitting within said hollow central portion of said handle-bar, and a head portion comprising a compartment defined by a first flat radially-extending wall fixed to a first end of said tubular portion, an axially projecting peripheral flange, and a second wall spaced outwardly from said first wall and abutting said flange, said second wall having at least one sound passage therein, a leaf spring member extending longitudinally outside said tubular portion from a second end, opposite said first end, to said first end in an arc-like configuration for engagement with the inner surface of said wall of said handle-bar to retain said tubular portion within said hollow central portion with said first wall of said head portion abutting said end of said handgrip, a piezoelectric transducer mounted within said compartment, circuit means within said tubular portion connected with said piezoelectric transducer to form an oscillatory circuit, an electric cell within said tubular portion for supplying electric power, and switch means externally of said head portion including a pressure sensitive switch connected through said switch means to said cell and said circuit means, said switch having an open and a pressure-operated closed condition and in said closed condition providing electric power to said oscillatory circuit causing said transducer to generate an audible sound.

11. A warning device as claimed in claim 10, in which said second wall of said head portion is fixed to said flange with an adhesive.

12. A warning device as claimed in claim 10, in which said second wall has a longitudinally projecting peripheral wall portion having an inner diameter just greater than the outer diameter of said peripheral projecting flange, and fastening members spaced around said longitudinally projecting peripheral wall portion of said second wall for engaging said first flat wall to secure said second wall to said flange.

13. A warning device for generating an audible warning sound and adapted for incorporation in the handle-bars of a bicycle, said handle-bar comprising a handle-bar wall of generally circular cross-section defining a hollow central portion, said warning device comprising:
    a tubular portion for fitting within said hollow-central portion and having opposite first and second ends;
    a leaf spring member extending from said second end to said first end of said tubular portion and having an arc-like configuration for engaging the inner surface of said wall of said handle-bar for retaining said tubular portion within said hollow-central portion;
    a head portion fixed to said first end of said tubular portion for abutting the end of said handle-bar;
    a transducer mounted within said head portion;
    circuit means within said tubular portion connected with said transducer;

means for supplying electric power to said circuit means for generating said transducer to generate an audible sound; and switch means extending from said head portion externally of said handle-bar and connected to said means for supplying electric power whereby operation of said switch means supplies electric power to said circuit means for generating said audible sound.

14. A warning device for a bicycle, comprising:

a casing having a tubular portion sized for fitting within the end of a bicycle handle-bar and a head portion for abutting the end of said handle-bar, circuit means in said tubular portion, a transducer in said head portion and connected with said circuit means, means within said tubular portion for supplying power to said circuit means and having first and second terminals, said second terminal being connected to said circuit means, a spring member extending outside said tubular portion substantially the entire length thereof and having an arc-like configuration for engaging the inside of said bicycle handle-bar for retaining said casing in position, and a switch having an open and a closed condition mounted to said head portion and accessible externally, said switch having a first terminal connected through said spring member to said first terminal of said cell and a second terminal connected to said circuit means, said switch in said closed condition supplying electric power to said circuit means and said transducer for generating an audible sound.

15. A warning device for a bicycle, comprising:

a casing having a tubular portion sized for fitting within the end of a bicycle handle-bar and a head portion for abutting the end of said handle-bar;

means for securing said warning device to said handle-bar;

drive circuit means in said tubular portion;

means for supplying power to said drive circuit means;

a transducer in said head portion connected with said drive circuit means: and switch means comprising a switch arm of flexible insulating material extending from said head portion and curving over the end of a handgrip portion of said handle-bar and including a substantially flat member of flexible insulating material at the end of said switch arm adjacent said handgrip portion, said flat member containing a pressure actuated switch, said pressure actuated switch being operable with pressure on said flat member between an open condition and a closed condition for energizing said drive circuit means to operate said transducer.

* * * * *